- Graphite Thread
- Carbide
- Ni Ti Alloy

- Ni Ti Alloy
- Carbide

Inventor
Edward E. Hucke

Attorneys

United States Patent Office 3,348,967
Patented Oct. 24, 1967

3,348,967
PROCESS OF MAKING AN ARTICLE HAVING A HARD CARBIDE, BORIDE OR SILICIDE OUTER REGION
Edward E. Hucke, Ann Arbor, Mich., assignor, by mesne assignments, to Valley Company, Inc., Atchison, Kans., a corporation of Kansas
Filed Dec. 27, 1962, Ser. No. 247,676
4 Claims. (Cl. 117—118)

This application is a continuation-in-part of my copending application Ser. No. 71,071 filed Nov. 22, 1960, now U.S. Patent No. 3,235,346 and entitled Articles of Manufacture and Methods of Their Production.

My present invention and discoveries relate to improved articles of relatively high hardness, and to improved articles embodying constituents or components of relatively high hardness, and to their methods of manufacture. As hereinafter referred to, my improved articles are composed substantially entirely or partially of materials of relatively high hardness.

More particularly my invention and discoveries relate to improved articles formed from combination of elements having non-metallic properties such as carbon in its three known states, boron, silicon and the like which combine with metals to form compositions that are too hard to form by usual metal machining operations and have melting points so high that their formation by casting is impractical and in some cases impossible. The best known and most widely used of such compositions are the metallic carbide phases. Others such as the boride and silicide phases are not so well known nor used, but have interesting possibilities as articles of manufacture when produced in accordance with my invention. Therefore, the following description of my invention and discoveries will be primarily devoted to my improved process and carbide articles produced thereby.

Many of the elements in the periodic table form very stable metallic carbide phases. The best examples are the carbides of beryllium, boron, silicon, titanium, vanadium, chromium, manganese, iron, zirconium, niobium, molybdenum, hafnium, tantalum, tungsten, thorium, plutonium and uranium. Certain of these, such as tungsten carbide, titanium carbide, and silicon carbide have found wide use in engineering applications of all kinds due to their extreme hardness. Others of the group, such as the carbides of uranium, zirconium, thorium, and plutonium have very interesting nuclear properties which might lead to their utilization as nuclear device components. Aluminum carbide may also be useful. Many show promise in applications involving corrosion resistance and high strength at elevated temperatures. All of these carbides possess a very high melting point, most of them well in excess of 2000° C.

It is paradoxical that the high melting point which is the basis for many of their most interesting properties is also a major factor which tends to defeat efforts to fabricate these materials into useful shapes. Their fabrication has in almost all cases been by powder metallurgy. The sintering operation characteristic of powder metallurgical processes, must be carried out close to the melting point. Since this temperature is in most cases above 2000° C., very few applications have been made where a carbide body is sintered without the use of a lower melting point binder material. The composite structures, composed of a cementing metallic phase which binds one or more carbide phases have been given the name "cemented carbides" or sometimes "hard metals," and belong to the general class called cermets.

The most popular of these cemented carbides utilize one of the iron group metals, such as cobalt or nickel to bind particles of tungsten or titanium carbide. In recent years a large technology has grown up around the methods possible for making cemented carbide bodies. An excellet review of the literature in this field is contained in "Cemented Carbides" by Schwarzkopf and Kieffer, McMillan Company, 1960, and "Treatise on Powder Metallurgy," vol. II, C. G. Goetzel, Interscience, 1950.

All powder metallurgical processes involve at least the following steps. (1) There must be the preparation of the finely powdered carbide and binding metal. (2) The materials must be intimately mixed such as by ball milling. (3) The mixture must be pressed into a "green compact" with pressures of the order of 5–20 tons per square inch. (4) Consolidation of the "green compact" is brought about by the mechanism of sintering, which requires a high temperature, controlled atmosphere heat treatment. In order to achieve desirable results rather close control must be maintained in all of these steps.

Sintering, which involves the closing of the internal voids left after the initial pressing, is very markedly accelerated by the presence of a liquid phase. It is for this reason that sintering of cemented carbides is normally carried out above the melting point of a particular binder metal which has been selected. Due to the extreme hardness of the cemented carbides, fabrication into finished shapes is feasible only before the final sintering operation. In the green state machining can be accomplished without undue difficulties. However, after final sintering the only methods available for shaping the object are extremely tedious and costly.

The production of the carbide articles, either with or without a metallic binder, by the ordinary processes of powder metallurgy imposes severe limitations. First the cost involved is necessarily high since preparation of extremely fine particulate matter with controlled properties is at best an expensive procedure. The milling, pressing, and sintering necessarily involve extensive time and expensive equipment. The pressing step, due to the high pressure required poses a severe limitation on the practical size to which cemented carbides can be made by powder metallurgical methods. This is due to the extreme size of the presses and tooling required to adequately consolidate compacts of greater than several square inches in cross section. In addition, the pressing operation involves limitations on shape. Only rather simple shapes are possible. More complicated shapes require the production of expensive multi-action dies with inserts in order to achieve uniform pressed density and to allow removal of the green compact. Tolerance of the finished piece is also a problem since any non-uniformity which exists in the green compact will cause non-uniform shrinkage during sintering and hence cause variation in the dimensions of the piece. The linear shrinkage during final sintering is often 15% or more. Non-uniformity due to segregation in the compacts, as well as grain growth during sintering often cause undesirable microstructures to occur from point to point in the finished product. The final microstructure often involves one to five percent porosity, which detracts from the desirable properties of the final product.

My process involves the novel feature of infiltration with a liquid metallic alloy that is purposely chosen such that one of the constituents will chemically react with the carbonaceous mass yielding a desired metallic carbide as a product of the reaction. By infiltration of a carbonaceous body or framework, I mean introduction of molten metal into the porous structure of the framework beyond merely filling the apparent surface pores to provide a surface coating. The depth of molten metal infiltration need not be complete in every case, but may vary according to the particular article desired and carbide phase or phases involved. The primary consideration of the infiltration step in the preferred embodiment of this invention is that it should provide a carbon body infiltered with enough molten metal, and to a depth sufficient, to permit the infiltered article to be machined or otherwise shaped as desired prior to substantial carbide formation, and subsequently heat treated to produce the desired carbide phase or phases, of the character to be fully described below by way of example. Therefore, as used hereafter in this specification and appended claims, infiltering and infiltration indicate molten metal impregnation of the nature consistent with the context of this paragraph. An infiltering step in the production of cemented carbide is in itself not new. There are indeed many patents in this field, but they involve infiltration of prepared metallic or carbide skeletons with metals of a lower melting point. These systems seek whenever possible to minimize any possible interaction occurring between the infiltering alloy and the skeleton. The carbide is always originally present as the skeleton and therefore does not form by reaction during or after infiltration. A good summary of these patents is contained in vol. III, "Treatise On Powder Metallurgy," by Goetzel.

Various disclosures have been made of coating processes which involve contacting a molten metal and a carbon body under certain conditions, generally for the purpose of producing protective coatings for the carbon body in its environment of intended use. The present invention is distinguishable from such coating processes primarily because the latter are directed only to coatings rather than relatively hard, shaped carbide articles arising from the molten metal infiltration of carbon or graphite, and subsequent heat treatment. For example, Smiley Patent 3,019,128 discloses applying molten metal to a carbon body to form a metal carbide surface layer, which in combination with metal and metal oxide layers, produces a refractory and heat transfer coating desirable on rocket nozzles and the like.

Similarly, Gurinsky Patent 2,910,379 discloses a process in which molten metal is applied to a carbon liquid nuclear fuel container to prevent deleterious poisoning arising from graphite reaction with nuclear fuels and fission products. Gurinsky forms a carbide-nitride protective coating by contacting the graphite article with a molten carrier metal such as bismuth and lead for example, containing a small amount of carbide former.

Other coating disclosures involving molten metal-carbon body contact are Steinburg Patent 2,929,741 and Winter Patent 2,597,964. Steinburg discloses a process of producing thin metallic carbide coatings on graphite by contacting the latter with a molten alloy comprised of a low melting point solvent metal and less than 20% carbide former such as titanium. By a process of layer diffusion a carbide containing coating on the outer surface of the graphite is formed, followed by removal of the low melting point solvent metal from the coating layer, by high temperature vacuum treatment.

Winter discloses a method of making carbide articles by dipping a carbon skeleton into a solution of the metal in acid, or an acid or solution of a salt of the metal, and subsequently heating the impregnated skeleton to obtain a chemical reaction between the carbon skeleton and the solution. The reaction is of the type that changes the valence state of the metal and evolves a gaseous reaction product, which must escape from the article through interconnecting pores. Next in a method step which is completely obviated by the present invention, Winter introduces siliceous material via the interconnecting pores in his reacted skeleton to obtain a fluid impervious article.

In U.S. Patent 2,098,062, issued Nov. 2, 1937, to R. Palmer the surface of an almost solid piece of carbon is infiltered with an alloy that wets the carbon. In this case, if any reaction occurs, it is limited to a superficial wetting. The patent is directed at a method of joining or bonding metal to carbon or carbon to carbon and there is no attempt to form a carbide in heat treatment.

My present invention has the advantages of producing metallic carbide articles in almost unlimited shapes without using the techniques of powder metallurgy. It is characterized generally by the discovery that carbonaceous bodies such as graphite or charcoal for example, can be impregnated with a molten metal which will react therewith to form carbide, thereby enabling the production of a wide variety of useful products without being limited by any of the fundamental weak points of a powder metallurgical process. My process makes it possible to achieve a degree of uniformity and a versatility never before possible in the fabrication of carbide bodies.

Product variations may be achieved and regulated by the materials used, and the specific manner of processing, as will be explained fully below and include, for example, carbonaceous porous bodies infiltered to a substantial depth with metallic carbide forming material, finished to desired shapes and then heat treated to form pore free outer layers with inner porous structure; carbonaceous bodies having the pores thereof substantially filled with metallic material, shaped to desired external form and then heat treated to form very hard solid pore free carbide; and variations thereof. Similarly, such varieties of novel products may be formed by infiltering other base framework materials having non-metallic properties as for example from boron and silicon.

Accordingly, it is a primary object of my present invention and discoveries to provide a novel process of making articles in a wide variety of shapes embodying hard reaction products.

Another object is to provide a process for making a carbide containing article by infiltering a porous carbonaceous framework, shaped as desired either before, during or after infiltration, with a molten metallic liquid containing at least one ingredient element capable of combining with the carbon of the framework to form carbide.

A further object of my invention is to provide a carbide article forming process wherein a carbonaceous framework or body is infiltered with molten metallic material, machined or otherwise shaped as desired, and thereafter subjected to carbide forming conditions.

Another object of the present invention is to provide a process of making a substantially pore free carbide article by infiltering and heat treating a molten metallic material in a carbonaceous framework which may be porous carbon skeletons, powdered carbon particles, foamed carbon, carbon batt, carbon fiber cloth, or other carbonaceous materials.

Still another object of the present invention is to provide a process for making carbide articles by infiltering a carbonaceous framework with a molten metallic liquid embodying at least one element whose Gibbs potential at its carbide forming reaction temperature and pressure is greater in the metallic liquid than the Gibbs potential of the same element in any carbide phase or phases possible between all elements included in the system.

Another object of the present invention is to provide novel carbide articles made by a novel process of infiltering a carbonaceous framework with molten metallic liquid embodying at least one carbide forming element at temperatures sufficient to completely or partially react the carbon in the framework with the carbide forming element in the molten metallic liquid.

Other objects and advantages of the present invention will become apparent to those skilled in this art from the appended claims and following description of the best mode of carrying out the invention, examples, and modifications thereof, and accompanying drawings (which are photomicrographs of 500X magnification) wherein:

Figure 1:
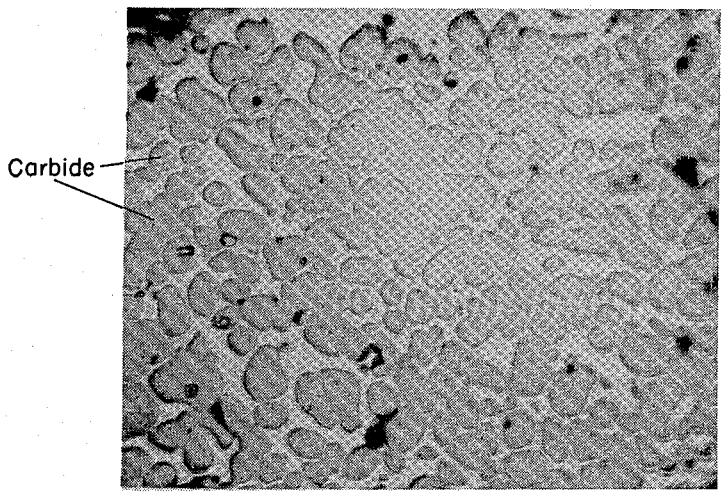
FIGURE 1 shows a charcoal framework infiltered and heat treated with a Ti-Ni alloy in accord with the preferred process of my invention.

In its preferred form my present invention provides for the production of articles containing at least one hard, high melting point phase such as a carbide, boride, silicide, or the like. This is accomplished by infiltering a permeable framework havng as an ingredient element thereof, carbon, boron or silicon, with a molten metallic material having at least one ingredient element capable of chemically combining with the carbon, boron, or silicon of the framework to form the aforesaid hard high melting point phase. The framework may be shaped before, during or after infiltration. Similarly, the molten metal infiltrant and framework may be subjected to conditions sufficient to promote formation of the desired hard, high melting point phase during or after infiltration. Shaping, and then formation of the desired hard phase are preferably carried out in order subsequent to infiltration to insure that nothing impedes the important infiltration step.

In the case of carbide formation which is currently of greatest commercial importance, the framework is contacted with a molten metal comprised of at least one carbide forming element. This enables the carbide formed to spall from the framework, and float in the unreacted, or binder portion of the melt. Carbide formation by such a mechanism is rapid, controllable, and capable of producing small particles which will generally result in higher product hardness than with larger particles. Moreover, formation by spalling averts diffusion barrier problems such as are established in the Steinberg process discussed above.

The resulting properties of my improved articles can be varied over wide ranges by the selection of the composition of the infiltrant, the framework pore volume and surface area, and the reaction temperatures. Such variations result primarily in increasing or reducing the rate and ultimate amount of carbide formation in the article and consequently the amount of graphite or carbon which will be left unreacted. These same variations in cases where all of the carbon reacts provides a means of varying the composition of the metallic phase binding the carbide.

In the preferred commercial embodiment of my invention a previously shaped porous or interstitial carbonaceous framework or skeleton is substantially filled with molten metallic alloy embodying a carbide forming element, as for example tungsten, titanium, zirconium, etc. The framework can be easily pre-shaped by conventional machining methods, or in the case of fibrous materials by pressing.

The framework is preferably held in contact as by dipping in the molten metallic material, so that the latter fills the pores under the influence of surface energy (capillary action), aided if necessary by the application of a pressure differential in any well known manner. During the infiltration some reaction between the molten metallic material and the carbon occurs. However, this reaction is very slight unless the temperature of the bath is very high. In many instances a bath temperature only slightly above its melting point will not cause more than a superficial surface reaction to occur, although it is possible in accordance with my invention to carry out at least part of the desired reaction at the time of infiltration by superheating the bath. This adds versatility to my process as will be described.

The infiltration in this embodiment of my invention results in a structure which after cooling shows no detectable porosity when examined under a microscope at 500 magnification. After infiltration and cooling, but prior to carrying out the carbide forming reaction, the body can be shaped with conventional cutting tools since it still contains a carbon framework or skeleton. The infiltered bodies in this embodiment have ample strength to be handled during machining. They have been turned, milled, sawed, and drilled without difficulty.

After the machining operation, pieces formed in accordance with this embodiment are heated in a protective atmosphere or vacuum furnace to cause the infiltered metallic material to react with the carbonaceous framework yielding the desired metallic carbide, alone, or in combination with a cementing metal present as a component of the infiltering alloy. Furnaces of the type required for such processing are commonly known in the art.

A more specific example of the preferred mode of carrying out my invention is as follows. An alloy containing weighed amounts of commercially pure titanium bar stock and water atomized nickel shot was melted. The composition of this alloy was 70% titanium by weight and 30% nickel by weight. The alloy was melted in a graphite crucible in a vacuum furnace operating at a pressure of about 100 microns of mercury. After melting a piece of National Carbon Company grade 60 porous filter graphite having a porosity of approximately 68% was dipped slowly into the molten metal. The molten metal was held at a temperature of approximately 1200° C. and readily wet the graphite skeleton, completely infiltering it in less than 3 minutes total time. The specimen size was approximately ½" x ½" x 4". After cooling the specimen could easily be cut with a hacksaw and other machining operations could be carried out. After shaping pieces of the infiltered material were subjected to a heat treatment in vacuum at 1400° C. for 6 hours. This heat treatment resulted in the formation of fine particles of titanium carbide imbedded in an alloy of nickel shown in FIGURE 4B. The microhardness of the carbide phase was approximately 2700 DPH.

Framework

The framework utilized in the preferred embodiment of my novel process are in general any permeable carbonaceous articles having pores intercommunicated by interstices or channels. Since this includes bodies composed of individual particles the term "framework" is preferred over "skeleton."

Carbon exists in three states, amorphous carbon hereafter referred to merely as carbon, graphite, and diamond. Amorphous carbon may also be partially graphitized or chemically activated, but no new classification is thereby created. The three states differ in crystal structure. In general it can be stated that if the framework contains the element carbon in any form, including carbide, it may be used to make carbide articles in accord with the present invention. This also includes materials such as the clay-graphites which have a large proportion of ingredients other than graphite, but which form very hard articles by virtue of the carbide phase developed therein by my process.

An example of a framework which has provided good results is foamed carbon made experimentally by Dow Chemical Company. It has round cellular structure with better than 99% of the cells interconnected by intertices. This material has the advantage of being capable of formation in any degree of porosity desired and attendant with high porosity, with thin cell walls. Porosity of a framework as used herein is defined as the fraction of space occupied by the bulk of the framework piece that is not occupied by the solid framework of the piece. The rate and extent of reaction will be governed to a certain extent by the amount of internal surface made available for contact with the molten metallic liquid. The foam type structure can be of either carbon or graphite. Carbon is cheaper and therefore preferred when the entire framework of carbon is to be reacted with the infiltrant. However, an unreacted graphite framework will provide better strength and lubricating properties than carbon, and as graphite is one of the best known neutron moderators certain of my improved articles (as for example an article which is 45% zirconium carbide, 5% uranium carbide and 50% graphite) are useful in reactor constructions. A carbide article made with foam carbon in accord with my invention which was very hard although the carbon did not go completely into the carbide forming reaction consisted of approximately 30% titanium carbide, 60% of iron-titanium alloy and 10% unreacted carbon. It was made by dipping the foam framework into a bath of iron-titanium melt at 1260° C. and thereafter heating the infiltered article to 1100° C. for 4 hours. A longer time or higher temperature heat treatment would have resulted in a larger percentaage of carbide.

Another type framework material which is utilized in the process of the present invention for making certain of my novel carbide articles is woven carbon or graphite fibers. The fibers can be woven and formed into any shape in which fibrous articles may exist. Fibrous batt may also be used as a framework material.

Certain of the advantages of fibrous framework materials reside in the fact that with the formation of only a small quantity of carbide useful products may be formed. This is in part due to the continuous fiber character of the framework which acts like a reinforcing rod in a metallic article much like a reinforcing rod in concrete.

Confined discreet particle of carbon may also be used as a framework or skeleton within the scope of the invention and can be made permeable by selection of particle size and degree of compaction dependent upon the amount of porosity and size of interstices required to accept the infiltrant at a practical rate, and the amount of carbon or graphite desired in the final carbide article.

Compacted bodies of particulate boron carbide, boron, silicon, and silicon carbide have also been found satisfactory in the formation by reaction of articles containing borides and/or silicides and/or carbides.

As hereinbefore mentioned my process is operative with many different types of carbon frameworks or skeletons. Products such as National Carbon Co., grade 20, 40, 50, 60 porous filter carbon and, the companion grades of graphite filter material as well as fibrous carbon available from National Carbon Co. and Barneby-Chenney Co. have been successfully used. Those from National Carbon Co. are preferably in the form of, for example, crushed carbon fibers, carbon felt, graphite fibers, felt, cloth, yarn, fibers crushed and bonded (pitch or resin bonded) and activated carbon discs. The Barneby-Chenney materials which have been found particularly good are carbon fibers 10 and 50 microns in diameter and activated carbon fibers. Furfural carbon frameworks may also be used composed of colloidal carbon with or without graphite fibers. Porous pyrolytic graphite also has been employed satisfactorily. The major variables other than the physical state of the carbon involved in the selection of a suitable framework are (1) the total pore and interstitial volume, (2) the size of the pore or interstitial openings, and (3) the pore and interstice surface area. The proper pore and interstitial volumes must be chosen in conjunction with the composition of the alloy to be used for infiltration and, will vary markedly depending on the desired final structure and composition.

The larger the total interstitial or pore volume in the original carbon framework or skeleton, the smaller the total amount of carbon present is, and hence the smaller total amount of carbide forming element required to completely react with the carbon. From a knowledge of the density of the molten material and its composition and the composition of the carbide formed, anyone skilled in the art can from simple volume and mass considerations calculate the total pore volume required in the original carbon skeleton. By way of example the interstitial volume required to yield a homogeneous body of uranium monocarbide is approximately 70% when the infiltering metal is pure uranium.

The size of the interstitial or pore openings can also be varied over a wide range. The lower limit is dictated by considerations of the rate of infiltration. As the pore size becomes very small the rate of filtration becomes negligible. For a given pore volume, the pore surface area is of prime importance in determining the total amount of time to be allotted in the subsequent heat treatment for the formation of the metallic carbide. Very small pore size leads to an extended amount of surface area within the compact which leads to shorter reaction time for the formation of a given amount of carbide.

A carbide skeleton may also be employed as the framework. It is possible to infilter a carbide skeleton with an alloy, to form a more stable carbide. For example, I have infiltered silicon carbide with a nickel-titanium alloy to form titanium carbide, and infiltered boron carbide with nickel-titanium alloy to form titanium carbide. If the carbonaceous frameworks contain large quantities of gaseous impurities it may be necessary to remove them by common degassing methods, such as heating in vacuum or inert atmosphere prior to infiltration, order to avoid oxidation and porosity during infiltration or the subsequent heat treatment.

Molten infiltrant

It is recognized that an almost infinite number of alloys and carbide systems is possible and that all of these involve simple substitutions for persons skilled in the art. In general, the metallic infiltering materials suitable for my process include all those containing at least one element whose Gibbs potential at the carbide forming reaction temperature and pressure is greater in the metallic solution than the Gibbs potential at the carbide forming reaction temperature and pressure of the same element in any carbide phase or phases possible between all elements included in the system. The Gibbs potential is determinable independently from my carbide forming reaction and is suitably defined in "Thermodynamics," by Guggenheim, North Holland Publishing Co. which textbook is hereby incorporated by reference for a detailed explanation and definition of the Gibbs potential.

The composition of the infiltering molten material together with the total pore and interstitial volume of the framework determines the final over-all composition of the heat composite. The infiltering material may contain one or more active carbide formers and may be such that one or all elements comprising it take part in the reaction with the framework. Any element not participating in the reaction remains in a metallic binding phase for the reacted carbide particles. Both the type of active carbide former and its amount can be varied over wide limits. If desired an infiltering alloy can be chosen such that after complete reaction only a carbide phase remains. In this way it is possible to make a solid shaped carbide body which does not have any low melting binder remaining after the final heat treatment.

The composition of an alloy determines its melting point. It is possible to devise many useful infiltering alloys containing at least one carbide forming element whose melting points are very low compared with the metallic carbides or even with the binder metal which remains after reaction. By way of example, an alloy containing 71 parts by weight titanium and 29 parts by weight nickel melts at approximately 955° C. has been used to infilter a graphite skeleton of approximately 68% voids with an infiltering temperature of approximately 1020° C. This temperature is well below the melting point of either titanium (1720° C.) or nickel (1453° C.). Subsequent reaction of this alloy with the skeleton at 1100° C. produces titanium carbide particles distributed in a matrix of a nickel-titanium alloy. By means of this phase of my invention such a composite body can be made without heating above the melting point of nickel. The avoidance of high temperature processing and its attendant difficulties are an obvious advantage of my process. While a limitless combination of compositions is possible, certain compositions are more conveniently used than others. These compositions are those such as the Ti-Ni-alloy which contain rather large amounts of the reacting metal but still retain low melting points.

It is possible to utilize in my process infiltrating alloys made wholly or by modification of commercially available materials. For example, I have utilized commercially available alloys, among them an iron-titanium alloy whose composition is approximately 70 parts by weight titanium, 29 parts by weight iron currently manufactured by the Electromet Corporation to form a novel titanium carbide containing article useful as a sleeve bearing material when suitably shaped and heat treated.

My improved process is not limited to the formation of a simple carbide. It is possible to form solutions of one or more carbides or separate carbide phases. For example, when my process was carried out with an infiltering alloy of 30% Ni; 70% Ti the carbide formed was titanium carbide. The process was also carried out with an alloy of 35% Ni; 55% Ti; 10% Mo which yielded a structure containing both titanium carbide and molybdenum carbide. Further examples of alloys found suitable for producing complex carbide phases are set out below in Tables I and I-A.

TABLE I

|   | Ni | Ti | Mo | W | Co | Cr | Fe | V |
|---|----|----|----|---|----|----|----|---|
| 1 | 28 | 70 | 2 | | | | | |
| 2 | 26 | 70 | 4 | | | | | |
| 3 | 24 | 70 | 6 | | | | | |
| 4 | | 56 | | | 10 | 34 | | |
| 5 | | 55 | | | 15 | 30 | | |
| 6 | | 47 | | | 16 | 37 | | |
| 7 | 10 | 50 | | | | 40 | | |
| 8 | 7.5 | 57.5 | | | | 35 | | |
| 9 | 15 | 50 | | | | 35 | | |
| 10 | | 55 | | | | 45 | | |
| 11 | 12 | 56 | | | | 32 | | |
| 12 | | 64 | | | | | 20 | 16 |
| 13 | | 60 | | | | | 15 | 25 |

Addition of a minor amount (10% or less) of a rare earth element such as cerium or mischmetal has been found to have a beneficial deoxidizing effect and in a 30:70 Ni-Ti melt for example, produces smaller carbide particles at a faster rate. Mg, and Mo used in the compositions in Table I also give more desirable, smaller carbide particles, when compared to binary Ni-Ti. However, simultaneous additions of Mo and rare earth metals seem to be even more effective in control of particle size than when used individually. Smaller particles spall from the carbonaceous framework faster than larger ones, and usually result in giving the composite carbide article higher hardness. Example compositions are as follows:

TABLE I-A

|   | Cu | Ni | Ti | Mo | Ce | Ca |
|---|----|----|----|----|----|----|
| 1 | | 23 | 70 | 6 | 1 | |
| 2 | | 29.9 | 70 | | .1 | |
| 3 | | 28 | 67 | | 5 | |
| 4 | 78 | | 20 | | | 2 |
| 5 | Bal. | | 2 | | | .1 |

Ca increases the wettability of Cu-Ti melts at lower Ti concentrations. The Ca may be added as metal or as a calcium silicon alloy.

*Heat treatment*

The extent to which the reaction occurs can be controlled by controlling the amount of carbide forming element in the infiltered piece. It is possible to use all of the carbon in the carbide reaction; or if desired, to leave some carbon in the structure. Either alternative is useful in differing specific applications. For instance in making nuclear fuel elements of uranium, thorium, and zirconium carbide a substantial amount of graphite may be desirable for neutron moderation. Certain applications for electrical contacts such for example as generator brushes and bearing materials also should contain large amounts of retained graphite for its lubricating function and electrical properties.

The rate of production of carbide is determined by the temperature, metallic material, and the internal and external surface area of the framework. The rate is faster the higher the temperature and the larger the surface area. It is possible to carry out this reaction at a temperature below the melting point of the metal in the pores. However, as will be appreciated by those skilled in this art, faster rates are achievable if the temperature is raised until the metal is at least partially liquid. As an example a porous graphite sample, 68% voids, an average pore size of .0013 inch formed approximately 35% titanium carbide when heated to 1200° C. (alloy liquid) for 4 hours. The infiltering alloy was 70 wt. percent Ti and 30 wt. percent Ni. The same material when heat treated for 4 hours at 925° C., where the metallic phase is solid, showed less than 10% titanium carbide formed. The same infiltering alloy was introduced into a charcoal skeleton and held for approximately 30 minutes at 1300° C. The charcoal has a much larger surface area than the filter graphite. The treated charcoal piece showed no unreacted carbon and contained more than 75% titanium carbide particles of very small size as shown in FIGURE 1. The treated piece was extremely hard and could be cut only with great difficulty with a high speed silicon carbide cutting wheel.

A piece with similar hardness resulted from the vanadium carbide containing articles produced in accordance with the conditions set forth below in Example B of Table IB.

The size and shape of the carbide particles can be controlled somewhat. For achieving small rounded individual particles the reacting phase should completely "wet" the carbide phase, and temperature and time should be kept at a minimum consistent with achieving the desired amount of carbide. I have discovered that faster reaction rates and desirably smaller carbide particles may be produced by adding a minor amount of a rare earth element to the melt, or molybdenum or magnesium, as discussed above in connection with Tables I and IA. The concept of controlling the size and shape of the carbide particles has practical utility when it is desired to improve the mechanical properties as has been shown for conventionally produced cermets by N. M. Parikh in the book "High Temperature Materials," A.I.M.E. Symposium, 1957, published by John Wiley & Sons.

After heat treatment the body is complete except for any final sizing that may be desired.

The rates of reaction are faster when the composition and temperature are such that a considerable amount of liquid phase remains present at all times in the interstices and pores of the carbon framework or skeleton. As the reacting metallic phase becomes depleted in the element forming the carbide phase the possibility exists for the formation of other solid intermetallic phases which can act to slow down the reaction. For example, an infiltrant alloy which was initially molten may at the same temperature, due to depletion become partly or completely solid.

When the carbide forming reaction is carried out in a separate step a protective atmosphere should be provided so that the active carbide forming metal will not form oxide in preference to carbide. I have found that a molten chloride or fluoride flux is very useful in providing protection to the article during heat treatment.

If the reaction is carried out in the liquid region all machined surfaces of the infiltered structure will become wet with a thin liquid layer. This liquid layer provides a method for joining pieces. Two pieces machined smooth can be joined by placing them lightly together and heating until the infiltering alloy becomes molten and flows between them. As the carbide reaction takes place the pieces become joined together. Alternatively the pieces may be joined by contacting them during the infiltration phase after which the joined pieces may be heat treated and/or shaped as desired or as necessary. Joining of an infiltered piece with other materials may also be carried out. For example, such materials as impervious graphite, steel, (stainless or otherwise) Cu, and ceramics may be joined to an infiltered piece by contacting as aforesaid and heat treating. In the case of steel I have found that an interdiffused alloy layer is produced between the pieces being joined to effect a very good bond.

The alloy which remains after the carbide forming reaction has been carried to completion or has been caused to proceed at a negligible rate can be treated in a variety of conventional ways. Those skilled in the art are aware of many varied heat treatments for any given alloy system.

*Examples*

Figure 2A:
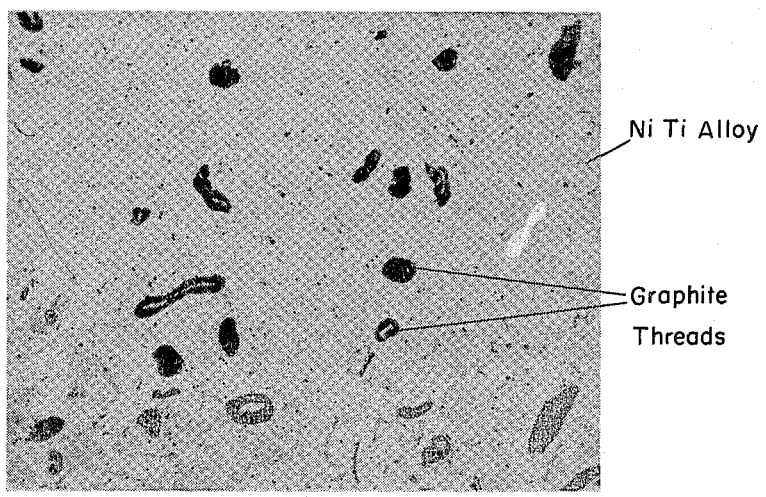
FIGURE 2A shows a graphite batt infiltered with a molten metallic material in accordance with the preferred process of my invention.
Figure 2B:
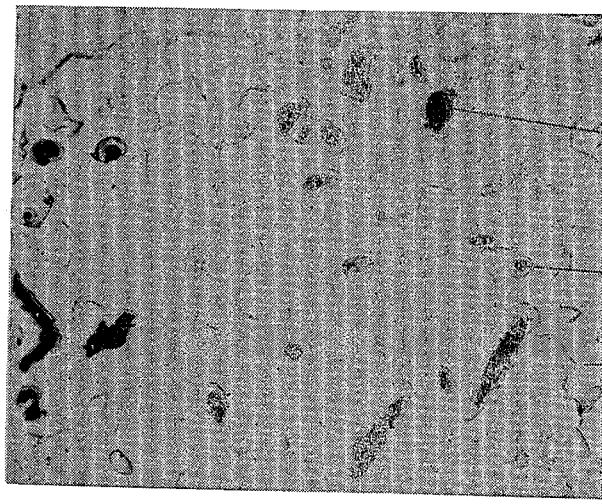
FIGURE 2B shows the early carbide stage of development in the infiltered graphite batt of FIGURE 2A during the heat treatment stage of my process.
Figure 2C:
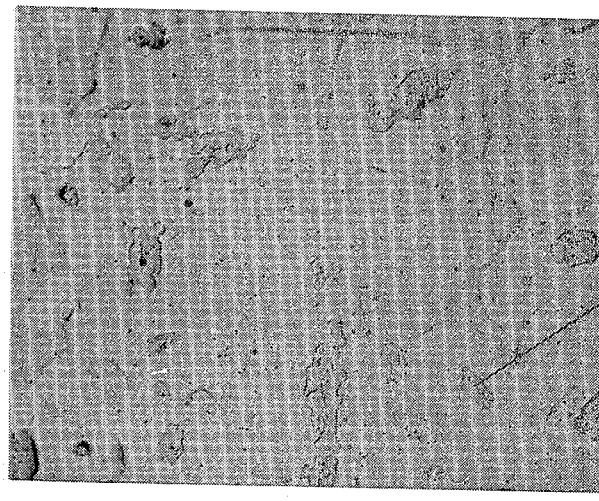
FIGURE 2C shows a carbide article formed in accord with my invention upon further heating of the infiltered carbonaceous framework shown in FIGURE 2B.

Referring to FIGURES 2A, 2B, and 2C, the phases of development of a carbide article made in accord with this embodiment of my invention are shown.

In FIGURE 2A, a graphite batt of the type made by National Carbon Co. is shown after it was infiltered in a bath of molten 70% Ti and 30% Ni by weight alloy for approximately three minutes at 1200° C. in vacuum. The arrows in FIGURE 2A point to a few of the graphite threads which form the batt with relatively large openings in the order of .001" between threads. The light appearing material in areas surrounding the batt threads is Ti-Ni alloy.

FIGURE 2B shows the graphite batt of FIGURE 2B after it has been treated for approximately 16 hours at 925° C. The large, black areas are graphite threads. The gray ring-like areas indicated by the arrows are areas of carbide formation as it begins to form.

In FIGURE 2C the carbide forming reaction has substantially completely reacted the graphite after 40 hours of heating at 980° C., leaving gray carbide particles, a few of which are indicated by arrows for identification, in a Ti-Ni alloy binder matrix. The heat treatment of this example was carried out in vacuum. The finished article contained titanium carbide with a melting point of more than 3100° C., a hardness of approximately 2700 DPH.

Figure 3A:
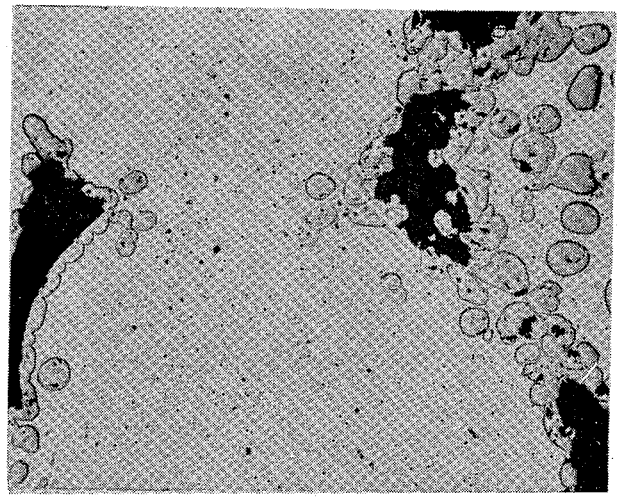
FIGURE 3A is a photomicrograph of a piece of foamed carbon as infiltered.

In FIGURE 3A, a foamed carbon framework is shown after infiltration with 70% Ti–30% Ni alloy for approximately 5 minutes at 1200° C., in vacuum. The large black areas are pieces of the framework which are surrounded by grey globular appearing areas of carbide which formed during infiltration. The carbide is not sufficiently formed to preclude conventional machining of the article at this stage. The white matrix area is Ni-Ti alloy and many of the tiny black objects in the matrix are small particles of titanium carbide.

Figure 3B:
FIGURE 3B shows the infiltered foamed carbon shown in FIGURE 3A after heat treatment in accord with my invention.

Thereafter as shown in FIGURE 3B the infiltered framework was subjected to carbide forming conditions at a temperature of about 1315° C., for 11 hours. The large grey globular carbide areas show the extent of carbide formation in the Ni-Ti alloy binder matrix. The carbonaceous material is substantially completely reacted and the finished article contained titanium carbide with a melting point of more than 3100° C. and a hardness of approximately 2700 DPH.

Figure 4A:
FIGURE 4A shows a piece of National Carbon Company filter graphite as infiltered with a molten metallic material.

In the example shown in FIGURE 4A, a piece of filter graphite #60 made by National Carbon Co. was infiltered by dipping in a molten bath of 70% Ti–30% Ni at about 1100° C. and in vacuum. The large black areas are graphite with small fringe areas of carbide as indicated by the arrows. The white area is again Ti-Ni alloy.

Figure 4B:
FIGURE 4B shows the impregnated filter graphite of FIGURE 4A after heat treatment.
Figure 5:
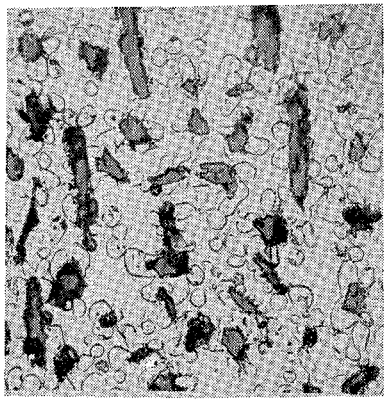
FIGURES 5–9 illustrate the progressive formation taken at 10 minute intervals, of a carbide containing article produced in accordance with the present invention.
Figure 6:
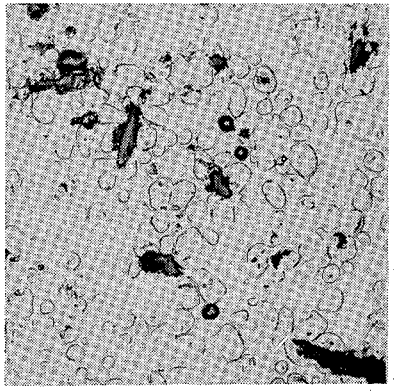
Figure 7:
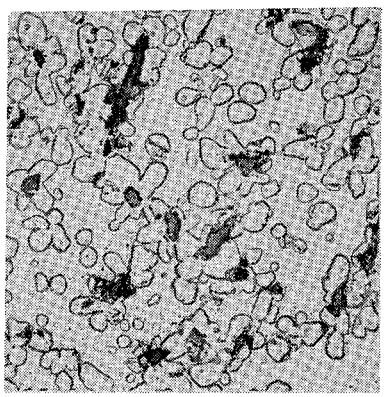
Figure 8:
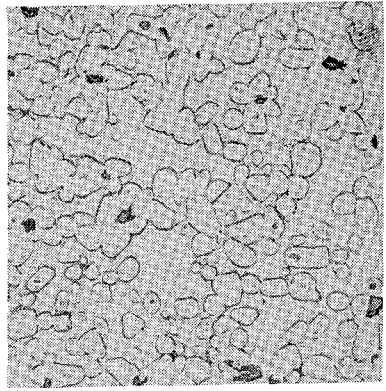
Figure 9:
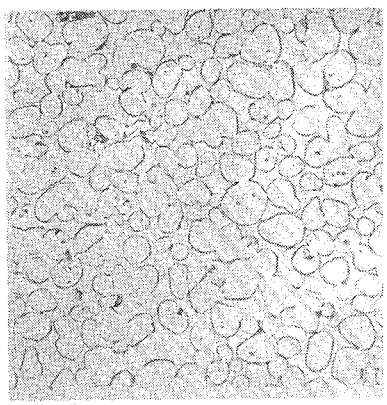

FIGURE 4B shows Ti-Ni infiltered graphite #60 after being heated to 1400° C. for 6 hours in vacuum. A large proportion of the article (grey areas) consists of carbide particles having a Ti-Ni alloy matrix. The large black areas are fragments of unreacted graphite.

In all cases the hardness of the carbide formed is approximately the same as carbide formed in more conventional ways. The hardness of the total body is dependent on the amount of carbide present as well as the amount present of the much softer metallic binder phases or unreacted graphite.

The following table of examples are illustrative of various molten infiltrating materials which may be used in my process with various framework and of various procedural variations which may be employed.

The tables of examples are divided according to the type of framework used for convenience. In each example is given the framework, alloy, the infiltration and heat treatment conditions, the hardness of the resulting carbide which is normally the same as that of a carbide formed in previously known processes, and the approximate amount of carbide formed in the articles.

The carbonaceous framework used as National Carbon Filter Graphite, pore size .0013 inch, volume 68% except in sample F where the pore volume was 53%.

TABLE I-B

|  | A | B | C | D | E | F | G |
|---|---|---|---|---|---|---|---|
| Infiltering alloy, percent by wt. | | | | | | | |
|  | 84% Zr 16% Fe | 47.5% V 52.5% Ni | 72% Ti 28% Co | 70% Ti 30% Ni | 67.2% Ti .12% B 29.4% Fe 3.4% Al | 70% Ti 30% Ni | 70% Ti 30% Ni |
| Carbide forming elements | | | | | | | |
|  | Zr | V | Ti | Ti | Ti, B, Fe | Ti | Ti |
| Alloy M.P., °C | 930 | 1,200 | 1,030 | 943 | 1,080 | 943 | 943 |
| Infiltration: | | | | | | | |
| Temp., °C | 1,260 | 1,290 | 1,200 | 1,100 | 1,150 | 1,100 | 1,100 |
| Atmosphere | Vac. | Vac. | Vac. | Vac. | Vac. | Vac. | Vac. |
| Time, Min | 10 | 10 | 10 | 10 | 1 | 1 | 1 |
| Flux | None | None | None | None | None | None | None |
| Heat Treatment: | | | | | | | |
| Atmosphere | None | None | Vac. | Vac. | Vac. | Vac. | Vac. |
| Time (hrs.) | None | None | 12 | 6.5 | 4 | 4 | 3 |
| Temp., °C | None | None | 1,230 | 1,450 | 1,400 | 1,400 | 1,330 |
| State | None | None | Liquid | Liquid | Liquid | Liquid | Liquid |
| Results: | | | | | | | |
| Approx. DPH hardness of carbide | 2,200 | 2,500 | 2,700 | 2,700 | ---------- | 2,700 | 2,700 |
| Approx. percent carbide formed | 10 | 80 | 10 | 40 | 50 | 45 | 20 |

Framework: National Carbon Co. filter graphite pore size .0013 inch. Porosity 68%.

TABLE I-C

|  | H | I | J | K | L | M | N |
|---|---|---|---|---|---|---|---|
| Infiltering Alloy, percent by weight | | | | | | | |
|  | 70% Ti 10% Mo Bal. Ni | 70% Ti 10% Mo Bal. Ni | 70% Ti 10% Mo Bal. Ni | 70% Ti 10% Mo Bal. Ni | 70% Ti 10% Mo Bal. Ni | 7.1% Mn 46.8% Ti 30.5% Ni 14.3% Al | 7.1% Mn 46.8% Ti 30.5% Ni 14.3% Al |
| Carbide forming elements | | | | | | | |
|  | Ti, Mo | Ti, Mo | Ti, Mo | Ti, Mo | Ti, Mo | Mn, Ti | Mn, Ti |
| Alloy M.P., °C | Approx. 943 | | | | | Approx. 1,100 | |
| Infiltration: | | | | | | | |
| Temp., °C | 1,100 | 1,100 | 1,100 | 1,100 | 1,100 | 1,315 | 1,315 |
| Atmosphere | Vac. | Vac. | Vac. | Vac. | Vac. | Vac. | Vac. |
| Time (Min.) | 3 | 3 | 3 | 3 | 3 | 2 | 2 |
| Flux | None | None | None | None | None | None | None |
| Heat Treatment: | | | | | | | |
| Atmosphere | Vac. | Vac. | Vac. | Vac. | Vac. | He | Air |
| Time (Hrs.) | 36 | 16 | 4 | 4 | 4 | 48 | 48 |
| Temp., °C | 950 | 1,150 | 1,230 | 1,230 | 1,300 | 927 | 927 |
| State | Liquid | Liquid | Liquid | Liquid | Liquid | Liquid | Liquid |
| Results: | | | | | | | |
| Approx. DPH carbide hardness | 2,800 | 2,800 | 2,800 | 2,800 | 2,800 | 2,700 | 2,700 |
| Approx. percent carbide formed | 15 | 25 | 20 | 25 | 30 | 25 | 25 |

The carbonaceous framework used was graphite batt (fibers .0002 inch thick) made by the National Carbon Company.

Framework (sample A) powdered carbon particles (—200 mesh). The particles are compacted to the desired density and confined in a graphite cylinder crucible which is then dipped into the molten alloy causing the metal to flow through a small hole in the cylinder and infilter the carbon particle compact.

The framework for sample B was powdered graphite particles ranging in size from .001 to .01 inch.

Framework: Foam carbon made by Dow Chemical Co., cells .004 in., 96% porosity.

TABLE II

|  | A | B | C |
|---|---|---|---|
| Infiltering Alloy, percent by weight | 70% Ti 30% Ni | 70% Ti 30% Ni | 70% Ti 30% Ni |
| Carbide forming element(s) | Ti | Ti | Ti |
| Alloy M.P., °C | 943 | 943 | 943 |
| Infiltration: | | | |
| Temp., °C | 1,100–1,200 | 1,100–1,200 | 1,100–1,200 |
| Atmosphere | Vac. | Vac. | Vac. |
| Time, Min. | 1 | 1 | 1 |
| Flux | None | None | None |
| Heat Treatment: | | | |
| Atmosphere | Vac. | Vac. | Vac. |
| Time (Hrs.) | 8 | 64 | 40 |
| Temp., °C | 930 | 930 | 982 |
| State | Solid | Solid | (1) |
| Results: | | | |
| Approx. DPH hardness of carbide | 2,700 | 2,700 | 2,700 |
| Approx. percent carbide formed | (2) | (3) | 80 |

1 Just into liquid.
2 Most graphite unreacted.
3 Increased amount carbide formed.

TABLE III

|  | A | B |
|---|---|---|
| Infiltering Alloy, percent by weight | 50% Ti 50% Cu | 70% Ti 30% Ni |
| Framework Porosity | 50% | 80% |
| Carbide forming element(s) | Ti | Ti |
| Alloy M.P., °C | 960 | 943 |
| Infiltration: | | |
| Temp., °C | 1,200 | 1,100 |
| Atmosphere | Air | Vac. |
| Time (Min.) | 10 | 1 |
| Flux | NaCl | None |
| Heat Treatment: | | |
| Atmosphere | None | Vac. |
| Time (Hrs.) | None | 10 |
| Temp., °C | None | 1,315 |
| State | None | Liquid |
| Results: | | |
| Approx. percent carbide formed |  | 35 |
| Approx. DPH hardness of carbide | 2,700 | 2,700 |

TABLE IV

|  | A | B | C | D |
|---|---|---|---|---|
| Infiltering Alloy |  |  |  |  |
|  | 67.2% Ti .12% B 29.4% Fe 3.4% Al | 67.2% Ti .12% B 29.4% Fe 3.4% Al | 70% Ti 30% Ni | 70% Ti 30% Ni |
| Carbide forming elements | Ti, B, Fe | Ti, B, Fe | Ti | Ti |
| Alloy M.P. °C | 1,080 | 1,080 | 943 | 943 |
| Infiltration: | | | | |
| Temp., °C | 1,150 | 1,150 | 1,100 | 1,100 |
| Atmosphere | (1) | (1) | (1) | (1) |
| Time (Min.) | 5 | 5 | 10 | 10 |
| Flux | None | None | None | None |
| Heat Treatment: | | | | |
| Atmosphere | Vac. | Vac. | Vac. | Vac. |
| Time (Hrs.) | 24 | 48 | 11 | 24 |
| Temp. °C | 1,315 | 1,315 | 1,315 | 1,315 |
| State | Liquid | Liquid | Liquid | Liquid |
| Results: | | | | |
| Approx. percent carbide formed | 45 | 50 | 40 | 45 |
| Approx. DPH hardness of carbide | 2,700 | 2,700 | 2,700 | 2,700 |

1 Vac., 100 microns.

Framework: National Carbon Co. graphite felt, fiber size .0002 inch.

TABLE V

|  | A | B |
|---|---|---|
| Infiltering alloy, percent by weight | 67.2% Ti .12% B 29.4% Fe 3.4% Al | 70% Ti 30% Ni |
| Carbide forming elements | Ti, B, Fe | Ti |
| Alloy M.P., °C | 1,080 | 943 |
| Infiltration: | | |
| Temp., °C | 1,150 | 1,100 |
| Atmosphere | (1) | Vac. |
| Time (Min.) | 5 | 1 |
| Flux | None | None |
| Heat Treatment: | | |
| Atmosphere | Vac. | Vac. |
| Time (Hrs.) | 15 | 4 |
| Temp., °C | 1,120 | 930 |
| State | Liquid | Solid |
| Results: | | |
| Approx. DPH hardness of carbide | 2,700 | 2,700 |
| Approx. percent carbide formed | 50 | 20 |

1 Vac., 100 microns.

Framework: Charcoal, 95% porosity.

TABLE VI

|  | A | B |
|---|---|---|
| Infiltering alloy, percent by weight | 70% Ti 30% Ni | 70% Ti 30% Ni |
| Carbide forming element(s) | Ti | Ti |
| Alloy M.P., °C | 943 | 943 |
| Infiltration: |  |  |
| Temp., °C | 1,100 | 1,100 |
| Atmosphere | Vac. | Vac. |
| Time (Min.) | 10 | 2 |
| Flux | None | None |
| Heat Treatment: |  |  |
| Atmosphere | Vac. | None |
| Time (Hrs.) | 10 | None |
| Temp., °C | 1,315 | None |
| State | Liquid | None |
| Results: |  |  |
| Approx. DPH hardness of carbide formed | 2,700 | 2,700 |
| Approx. percent carbide formed | 80 | 75 |

Other suitable compositions which have been found to give good results are set out in the following table.

TABLE VII-A

|  | Ni | Ti | Co | Si | Fe | Al | Cu | Mg |
|---|---|---|---|---|---|---|---|---|
| 1 | 28.5 | 71.5 |  |  |  |  |  |  |
| 2 |  | 70 | 30 |  |  |  |  |  |
| 3 |  | 85 |  |  | 15 |  |  |  |
| 4 |  | 80 |  |  | 20 |  |  |  |
| 5 |  | 70 |  | 25 |  |  | 5 |  |
| 6 |  | 65 |  | 25 |  |  | 10 |  |
| 7 |  | 10 |  |  |  |  | 90 |  |
| 8 |  | 15 |  |  |  |  | 85 |  |
| 9 |  | 20 |  |  |  |  | 80 |  |
| 10 |  | 25 |  |  |  |  | 75 |  |
| 11 |  | 30 |  |  |  |  | 70 |  |
| 12 |  | 35 |  |  |  |  | 65 |  |
| 13 |  | 40 |  |  |  |  | 60 |  |
| 14 |  | 60 |  |  |  |  | 40 |  |
| 15 |  | 60 |  |  |  | 5 | 35 |  |
| 16 |  | 60 |  |  |  |  | 34.5 | .5 |
| 17 |  | 60 |  |  |  | 10 | 30 |  |
| 18 | 30 | 69.5 |  |  |  |  |  | .5 |
| 19 |  |  |  |  | 98 |  |  |  |
| 20 |  |  |  |  | 99 |  |  |  |
| 21 |  |  |  |  | 99 | 1 |  |  |
| 22 |  |  |  |  | 95 | 5 |  |  |
| 23 |  |  |  |  | 90 | 10 |  |  |
| 24 | 42 | 20 |  |  | 38 |  |  |  |

Shaping

Carbonaceous frameworks may be initially shaped to desired configuration by conventional machining processes and carbon fiber frameworks can be preformed by pressing into rough shape. After machining to the shape desired, for example, to the shape of a cutting tool, or other tool wherein it is known that particularly hard materials are preferably employed, the heat treatment forms the carbide and the hard article is formed.

Numerous other methods of producing the desired shape in a finished article which are readily adaptable to an economical production technique, may be used. For example, I have found that mechanical shaping forces may be applied to a piece before, during, or after infiltration and during heat treatment, or during a combination of these process phases. Before infiltration the framework may be pressed into the desired shape and density if particulate material or loose fibrous material is used, or otherwise machined and formed as desired. Thereafter the framework may be held in contact with the surface of a molten metallic bath under conditions promoting infiltration by capillary action into the piece without substantial change of shape in the outer physical dimensions of the framework.

The infiltered framework may also be crushed during or after infiltration, or after being infiltered and while the infiltering alloy is still in a liquid state rolling out the framework thereby shaping and removing excess infiltrant in a single operation. For this purpose, a porous roller or the like tool, of absorbent material may be used to remove infiltrant and provide new shape to the infiltered framework, if desired.

Another shaping technique which may have important commercial advantages is to deform the infiltered piece during heat treatment by a hot press, forging or the like, or causing it to deform under its own weight. The latter has been found to yield particularly good results by heat treating the infiltered piece in a mold of the desired shape. Heat treatment at a sufficiently high temperature and for long enough time causes the piece to deform under its own weight sufficiently to occupy with good fidelity the cavity of a mold in which it is heat treated. This slump casting method may be augmented if necessary by application of weight or hot press to insure proper deformation into the mold.

Infiltration

The infiltration step of my process can be carried out in a number of ways and in a variety of different apparatus. One such apparatus is shown and described in "High Temperature Technology," p. 269, John Wiley, 1956. Since many infiltering materials are very prone to oxidize it may be necessary to provide some protection to avoid excessive oxidation and slagging which can cause difficulties in the infiltration and subsequent heat treatment step. Any slag which forms on the infiltering material must be kept from plugging the pores or interstices of the carbonaceous framework to prevent clogging, loss of permeability, and consequent inadequate infiltration. While it is possible to mechanically remove the slag in a region where the framework is to be contacted with the melts, it is usually necessary to provide a flux cover on top of the molten alloy to help prevent oxidation when infiltering from a molten alloy held in air. I have discovered that the flux also aids in the wetting of the carbonaceous framework or skeleton. The flux must have a melting point below the desired infiltration temperature and a low volatility. I have successfully utilized a mixture of 50 wt. percent sodium and 50 wt. percent potassium chlorides, as well as anhydrous barium chloride, to protect alloys of copper-titanium, nickel-titanium and iron-titanium. Another example of a flux which I have used with success is commercially available Cryolite which protected an alloy containing approximately 70% Ti and 30% Fe. A flux bath may be used as a protective environment for the heat treatment. For example, a flux consisting of approximately 70 wt. percent barium fluoride and 30 wt. percent calcium fluoride has been successfully used to protect a wide variety of alloys both during infiltration and subsequent heat treatment. Other stable fluorides and chlorides are also useful flux materials.

The use of a protective flux covering may be avoided by carrying out the infiltration in a vacuum furnace or a furnace equipped to operate with a protective gas environment. This type of furnace is commonly used in the current art for melting and heat treatment. Successful infiltration of a large number of alloys has been achieved at an operating vacuum of approximately 10 microns (.001 cm. Hg) as illustrated in the examples set out in the above tables such as those in Table I–B. In addition inert atmospheres composed of commercial grades of argon and/or helium have been used with success for the infiltration of 70 wt. percent Fe–30 wt. percent Ti into filter graphite.

The controlling principle of infiltration of a solid carbonaceous framework with a liquid is well known, and I have discovered that it is applicable to my compacted powder and compacted fiber interstitial frameworks as well. In general it is possible to infilter any porous structure with any liquid in any given environment when the total Helmholtz free energy (see for example Guggenheim, "Thermodynamics") of the system decreases upon infiltration. There is usually not enough available data to calculate the total Helmholtz free energy change. However it is usually sufficient for infiltration to take place that the molten alloy "wet" the solid framework (see Udin, Funk and Wulff, "Welding Metallurgy," Wiley, 1954). This condition of wetting imposes very little restriction on my process since all of my infiltering compositions are such that they are capable of reacting with the framework. This usually results in wetting of the solid by the liquid, which may however, be prevented by unwanted surface reactions occurring between the liquid alloy and/or the framework and constituents of the atmosphere. The latter is particularly prone to occur when the infiltering alloy contains a sizable percentage of aluminum. In such difficult cases fluxes can generally be used to bring about wetting. Pretreatment of the carbon containing skeletons can also be carried out in such cases. For example, formation of minute surface coatings of molybdenum carbide within the skeleton have allowed successful infiltration of Cu-Ti alloys not easily wettable under ordinary circumstances.

The infiltration can be carried out at a rate dictated by the normal capillary adsorption of the liquid metal or if desired to save time on larger pieces a faster rate can be achieved by the application of a suitable pressure differential, thereby forcing the molten liquid into the framework or skeleton. For most compositions and small samples a pressure differential is not required to achieve rapid enough infiltration. For large pieces the application of a pressure differential may be necessary in order to minimize the time required for complete infiltration. I have devised a number of systems for impregnation under pressure of various materials. In general, the size of the differential is dependent upon the size of the pore structure and the infiltrant as stated above and can be varied to obtain the desired amount of infiltration if less than complete infiltration is desired.

The pressure differential may be a positive pressure of up to 50 p.s.i. or greater however, this will be required with only the most infiltration resistant skeletons. In contacting the skeleton with the melt, the skeleton may be held in a tube of for example, stainless steel, or porous or impervious graphite. When positive pressure is to be applied to increase the speed of infiltration the skeleton containing tube has one end thereof immersed in the bath so that melt may flow inside it and contact the skeleton. The other end extends to the outside of the melt container, and pressure is applied to the melt tending to push the melt up the tube. The outer end of the tube may have a negative pressure drawn on it if desired to further increase the pressure differential across the skeleton in the tube.

Skeletons such as pressed powder bodies may be covered with solid alloy in granular form and heated in an inert atmosphere such as helium or argon.

The following example illustrates still another method of infiltrating a skeleton with very good results. An eutectic alloy of 71.5% Ti and 28.5% Ni was made by melting commercially pure titanium and nickel shot in an argon atmosphere and crushed to a maximum particle size of ¼ inch. The skeleton was prepared by crushing graphite felt and placing it in an alumina boat and covering it with a 1/16 inch thick sheet of 60% porosity filter graphite. The alumina boat with contents was placed in a furnace at 1175° C. and degassed for 10 minutes in an atmosphere of flowing argon and then cooled in argon. A quantity of the eutectic alloy melt sufficient to completely infiltrate the filter graphite and skeleton was placed on top of the filter graphite and the boat was then inserted into a furnace at 1175° C. and infiltered. After infiltration was complete as determined by visual observation through a glass port the specimen was cooled to room temperature. FIGURES 5–9 illustrate the formation of carbide by heat treatment at 1285° C. after heating for 10, 20, 30, 50 and 60 minutes respectively. The consumption of carbon in the reaction is readily apparent as the grey carbide content progressively increases, until, in FIGURE 9 substantially all of the carbon has been reacted and only carbide particles and binder are present.

I have also found that infiltration may be carried out by placing a wick in a molten bath for example, so that the upper wick surface is at the same level as the bath surface, and contacting the wick and skeleton (of smaller porosity than the permeable wick) to effect infiltration of the latter. Infiltration in this manner may have commercial mass production utility where for example, molten metal is continuously or intermittently, fed as needed into a wick containing bath while skeletons of the desired shape and size are caused to slide across the upper wick surface, for example, to a bath exit leading to a heat treating or shaping zone.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In the process for making an article having at least an outer layer of substantial thickness containing at least one hard, high melting point carbide, comprising the steps of:
   (a) infiltering a permeable framework which is essentially elemental carbon with a liquid metallic material comprising at least one metallic element capable of chemically combining with the framework material to form at least one hard, high melting point carbide, said infiltration being carried out at a temperature sufficiently low that said metallic material remains in the liquid phase throughout the infiltration of said framework, said infiltration being continued until substantially all of the voids in said framework are substantially completely filled to at least a depth sufficient to permit removal of an outer portion of said article of substantial thickness without destroying more than a minor outer portion of the infiltered region; and
   (b) subjecting the infiltered framework to carbide forming pressure and temperature conditions for a sufficiently long time to chemically combine at least a portion of said framework with at least one element in said metallic material to form at least one hard, high melting point carbide; the improvement of adding to said metallic material before the infiltration of said framework cerium in an amount sufficient to reduce the size of the particles produced in the reaction of the metallic material with the framework and in the range of from about 0.1 to about 10 percent of the metallic material.

2. In a process for making an article having at least an outer region of substantial thickness containing at least one carbide, comprising the steps of:
   (a) infiltering a permeable framework which is essentially elemental carbon with a liquid metallic material comprising at least one element capable of chemically combining with the framework material to form at least one carbide and at least one additional element capable of depressing the melting point of the infiltrant to a temperature below that of said one element to at least a depth sufficient to permit removal of an outer portion of said article of substantial thickness without destroying more than a minor outer portion of the infiltered region, said infiltration being carried out entirely at a temperature below the carbide forming temperature of any carbide forming element in said metallic material and below the temperature of appreciable vaporization of the infiltrant, whereby said metallic material remains in the liquid phase throughout the infiltration of said framework and there is substantially no chemical reaction between said framework and any carbide forming element in the metallic material during the infiltration of said framework; and thereafter:

(b) subjecting the infiltered framework to a pressure and temperature above that at which elemental carbon chemically combines with an element in said metallic material to form a carbide of said element, whereby at least a portion of the infiltered elemental carbon is converted to at least one carbide;

(c) the improvement of adding to said metallic material before the infiltration of said framework molybdenum in an amount sufficient to control the size of the particles produced in the reaction of the metallic material with the framework and in the range from about 2 to about 10 percent of the metallic material.

3. In a process for making an article having at least an outer region of substantial thickness containing at lease one carbide, comprising the steps of:

(a) infiltering a permeable framework which is essentially elemental carbon with a liquid metallic material comprising at least one element capable of chemically combining with the framework material to form at least one carbide and at least one additional element capable of depressing the melting point of the infiltrant to a temperature below that of said one element to at least a depth sufficient to permit removal of an outer portion of said article of substantial thickness without destroying more than a minor outer portion of the infiltered region, said infiltration being carried out entirely at a temperature below the carbide forming temperature of any carbide forming element in said metallic material and below the temperature of appreciable vaporization of the infiltrant, whereby said metallic material remains in the liquid phase throughout the infiltration of said framework and there is substantially no chemical reaction between said framework and any carbide forming element in the metallic material during the infiltration of said framework; and thereafter:

(b) subjecting the infiltered framework to a pressure and temperature above that at which elemental carbon chemically combines with an element in said metallic material to form a carbide of said element, whereby at least a portion of the infiltered elemental carbon is converted to at least one carbide;

(c) the improvement of adding to said metallic material before the infiltration of said framework magnesium in an amount sufficient to control the size of the particles produced in the reaction of the metallic material with the framework.

4. A process for making an article having at least an outer region of substantial thickness containing at least one carbide, comprising the steps of:

(a) infiltering a permeable framework which is essentially elemental carbon with a liquid metallic material comprising a major portion of copper and minor amounts of titanium and calcium to depress the melting point and increase the wetability of the metallic material, to at least a depth sufficient to permit removal of an outer portion of said article of substantial thickness without destroying more than a minor outer portion of the infiltered region, said infiltration being carried out entirely at a temperature below the carbide forming temperature of any carbide forming element in said metallic material and below the temperature of appreciable vaporization of the infiltrant, whereby said metallic material remains in the liquid phase throughout the infiltration of said framework and there is substantially no chemical reaction between said framework and any carbide forming element in the metallic material during the infiltration of said framework; and thereafter:

(b) subjecting the infiltered framework to a pressure and temperature above that at which elemental carbon chemically combines with an element in said metallic material to form a carbide of said element, whereby at least a portion of the infiltered elemental carbon is converted to at least one carbide.

References Cited

UNITED STATES PATENTS

| | | | |
|---|---|---|---|
| 2,431,326 | 11/1947 | Heyroth | 29—195 |
| 2,612,443 | 9/1952 | Goetzel. | |
| 2,636,856 | 4/1953 | Suggs | 117—228 X |
| 2,685,543 | 8/1954 | Sindeband. | |
| 2,691,605 | 10/1954 | Hediger | 117—118 X |
| 2,706,694 | 4/1955 | Haller | 117—112 |
| 2,761,794 | 9/1956 | Minnery | 117—112 |
| 2,863,211 | 12/1958 | Wellman | 29—182.5 X |
| 2,899,338 | 8/1959 | Goetzel et al. | 117—118 |
| 2,910,379 | 10/1959 | Gurmsky | 117—118 |
| 2,917,817 | 12/1959 | Tabar | 29—180 |
| 2,929,741 | 3/1960 | Steinburg | 117—118 X |
| 2,972,556 | 2/1961 | Vrahiotes et al. | 117—118 X |
| 2,994,124 | 8/1961 | Denny et al. | 29—195 X |
| 3,001,269 | 9/1961 | Moore et al. | 29—180 |
| 3,031,340 | 4/1962 | Girardat | 75—201 X |
| 3,129,070 | 4/1964 | Westbrook et al. | 29—195 |

MURRAY KATZ, *Primary Examiner.*

HYLAND BIZOT, RICHARD D. NEVIUS,
            *Examiners.*

R. O. DEAN, J. P. McINTOSH, *Assistant Examiners.*